United States Patent [19]

Kimura et al.

[11] Patent Number: 4,860,091
[45] Date of Patent: Aug. 22, 1989

[54] VIDEO IMAGE PROCESSING APPARATUS FOR EMPHASIZING COLOR OF AN IMAGE BY ENHANCING SATURATION

[75] Inventors: Kenji Kimura, Tachikawa; Kiyoshi Tsuji, Tanashi, both of Japan

[73] Assignee: Olympus Optical Co., Ltd., Tokyo, Japan

[21] Appl. No.: 302,550

[22] Filed: Jan. 26, 1989

Related U.S. Application Data

[62] Division of Ser. No. 123,975, Nov. 20, 1987, Pat. No. 4,814,859.

[30] Foreign Application Priority Data

Nov. 28, 1986 [JP] Japan ................. 61-283566
Dec. 18, 1986 [JP] Japan ................. 61-302155

[51] Int. Cl.$^4$ ............................... H04N 9/74
[52] U.S. Cl. ............................ 358/22; 358/27; 358/37
[58] Field of Search ............... 358/22, 27, 28, 37

[56] References Cited

U.S. PATENT DOCUMENTS

| | | | |
|---|---|---|---|
| 2,920,130 | 1/1960 | Gibson et al. | 358/16 |
| 4,007,327 | 2/1977 | Cousin | 358/22 |
| 4,533,938 | 8/1985 | Hurst | 358/27 |
| 4,639,769 | 1/1987 | Fleisher et al. | 358/27 |
| 4,639,771 | 1/1987 | Hattori et al. | 358/27 |
| 4,642,682 | 2/1987 | Orsburn et al. | 358/28 |
| 4,737,842 | 4/1988 | Nagasaki | 358/27 |

FOREIGN PATENT DOCUMENTS 59030  5/1979  Japan .................. 358/22

OTHER PUBLICATIONS

DIGITAL PROCESSING OF ENDOSCOPIC COLOR IMAGES; Ohyama et al.; in: Optics Communications, Sep. 15, 1985; vol. 55, No. 4, pp. 242-247.

Primary Examiner—John W. Shepperd
Attorney, Agent, or Firm—Frishauf, Holtz, Goodman & Woodward

[57] ABSTRACT

A composite video signal is supplied to chrominance and luminance signal separators. A chrominance signal is compared by a phase comparator with an average phase signal, and a difference between them is supplied to a control terminal of a phase modulator. The chrominance signal is input to the phase modulator. The phase averaging circuit, phase comparator, and phase modulator together constitute a hue emphasizing circuit. An output from the hue emphasizing circuit (output from phase modulator) is supplied to a mixer via a gain control amplifier (GCA). The chrominance signal is input to a level detector, where it is envelope-detected. An output from the level detector is supplied to a gain control terminal of the GCA. An output from the GCA emphasizing circuit (output from GCA) is a hue- and saturation-emphasized chrominance signal, and is supplied to the first input terminal of the mixer. A luminance signal is put to a phase shifter via a mixer. A hue-emphasized chrominance signal which is output from the phase comparator is subjected to quadratic differentiation by a differential circuit, and is input as a gain control input to a mixer. The last-mentioned mixer, differential circuit, and phase shifter together constitute an aperture compensator. The shift amount is set in the phase shifter, so as to compensate for a difference between the chrominance and luminance signals generated from the hue emphasizing circuit and the aperture compensator, respectively.

6 Claims, 10 Drawing Sheets

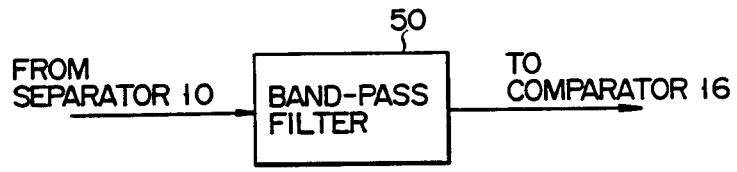
F I G. 4
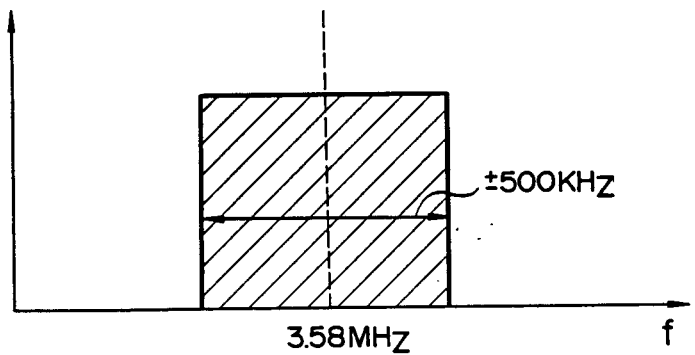
F I G. 5A
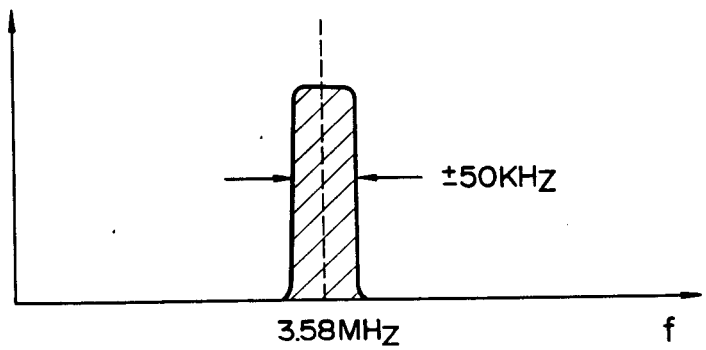
F I G. 5B

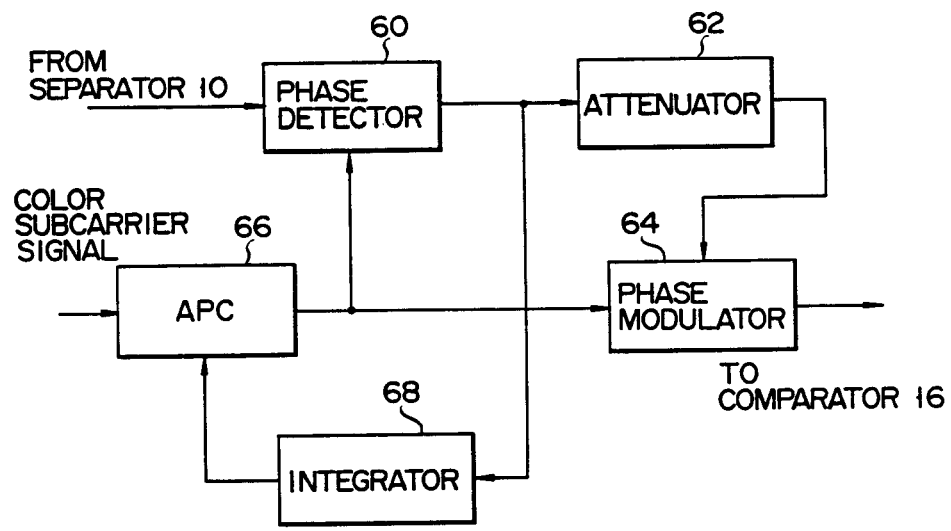
F I G. 6
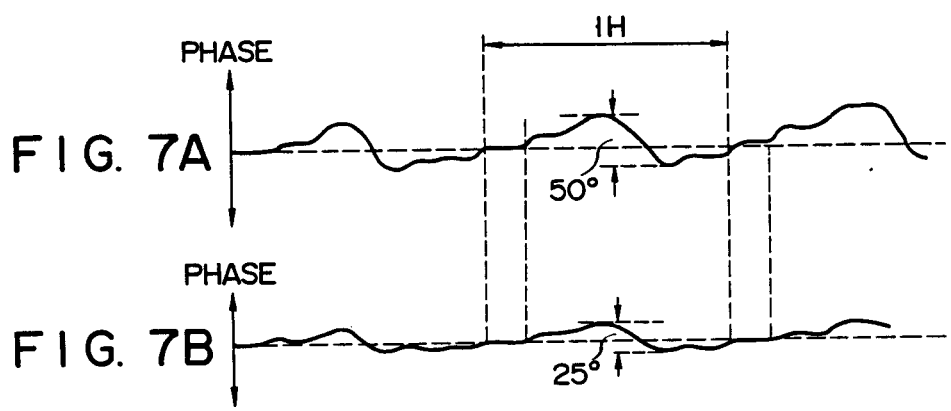
F I G. 7A
F I G. 7B

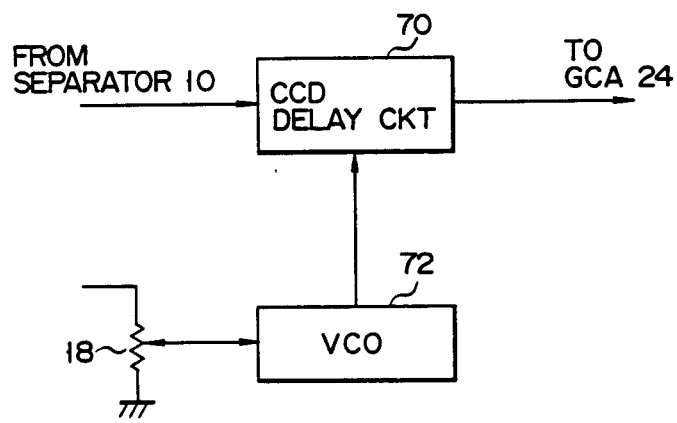
F I G. 8
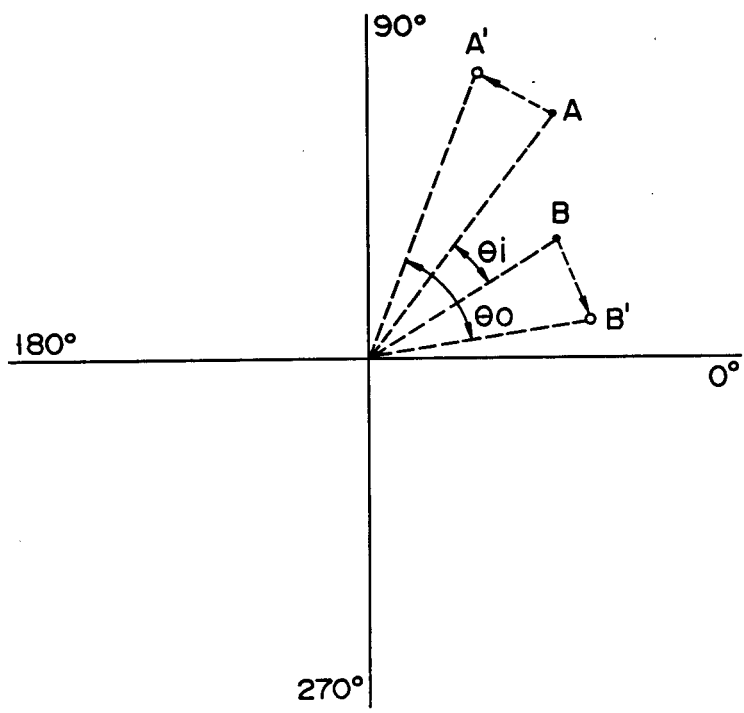
F I G. 9

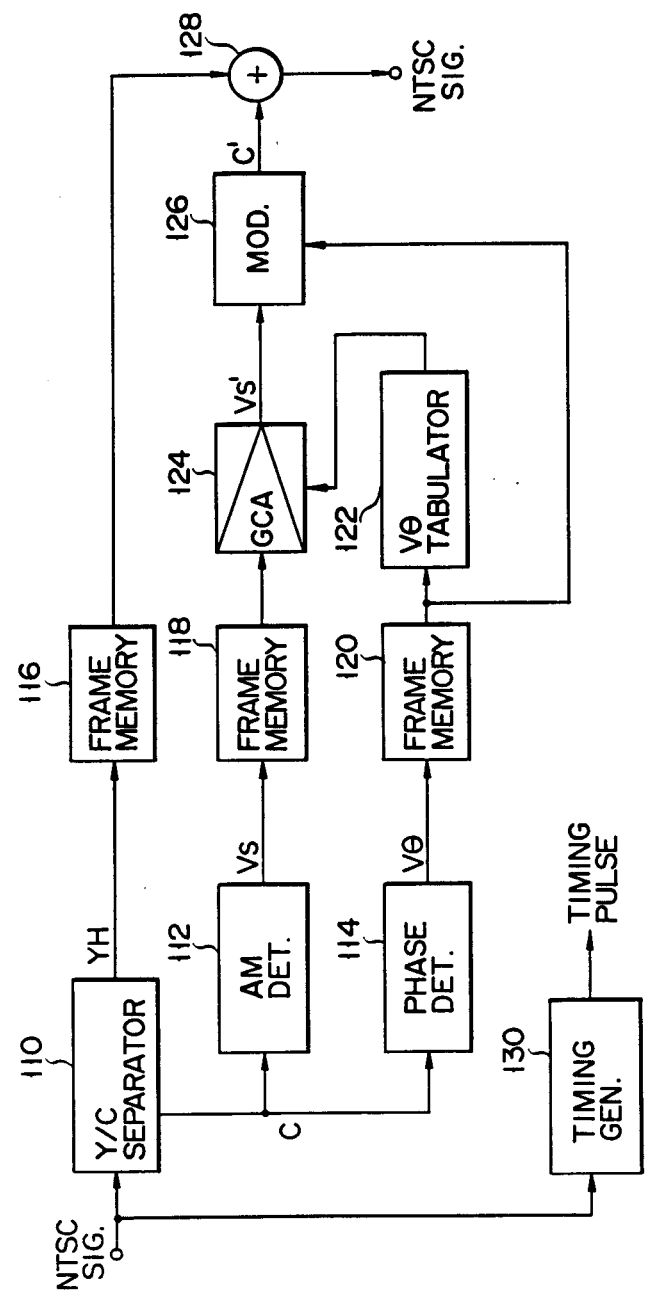
F I G. 13

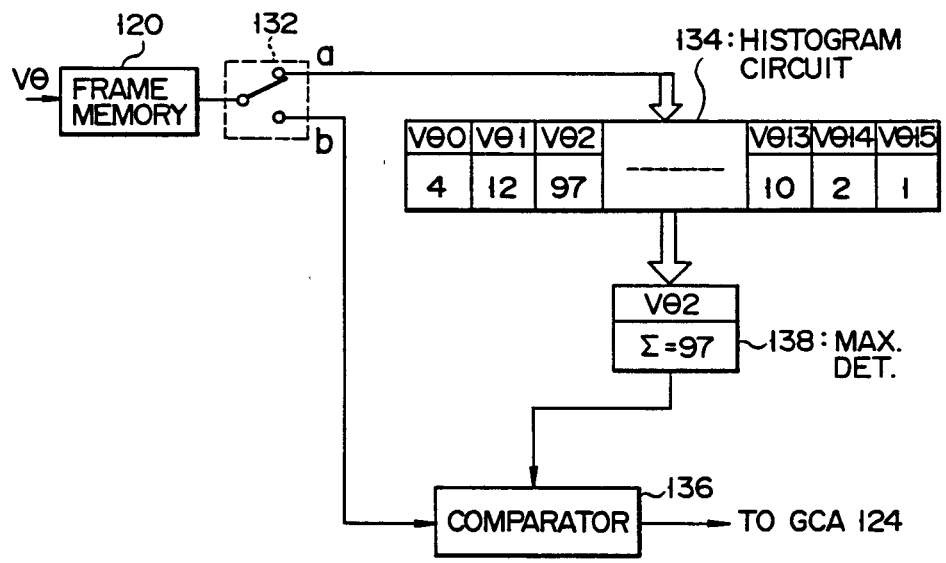
FIG. 15
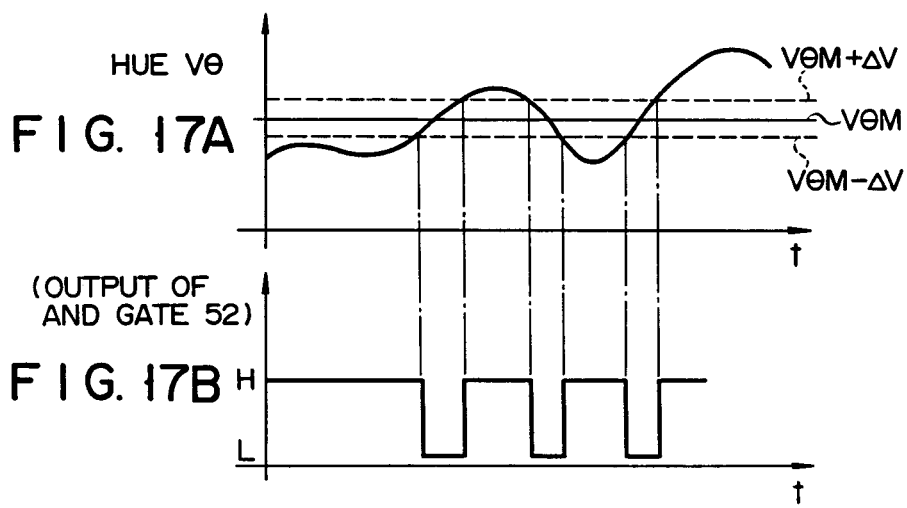
FIG. 17A
FIG. 17B

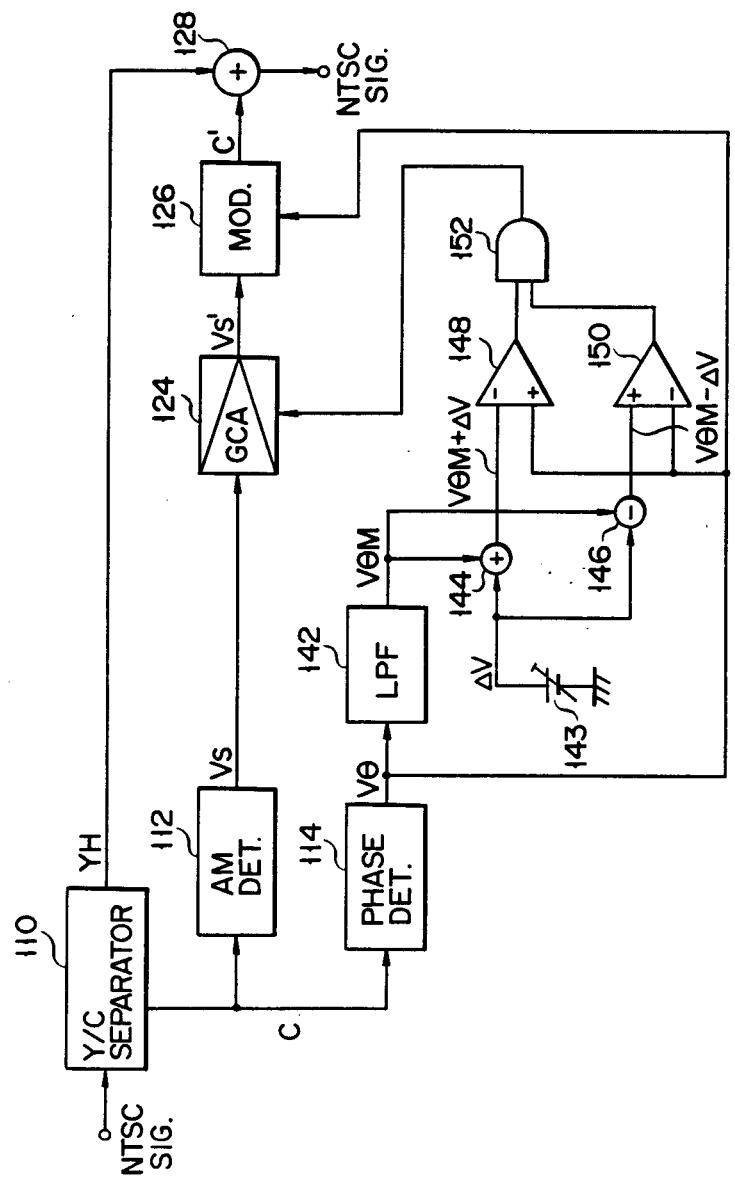
F I G. 16

4,860,091

VIDEO IMAGE PROCESSING APPARATUS FOR EMPHASIZING COLOR OF AN IMAGE BY ENHANCING SATURATION

This is a division of application Ser. No. 123,975, filed 11/20/87, now U.S. Pat. No. 4,814,859.

BACKGROUND OF THE INVENTION

The present invention relates to an image processing apparatus for emphasizing the color of an image.

These days, the video technique is used in a wide variety of applications. For example, in the medical field, an electronic endoscope having an image pickup device combined therewith is used for observing a diseased portion of a body cavity. Instead of being observed directly by the naked eye, the image of the diseased portion is picked up by the image pickup device, and is diagnosed on the basis of the image displayed on the monitor.

The hue of the image of a living body obtained in this manner is reddish and the change in saturation throughout is rather slight. Therefore, when a doctor, for example, observes the image, for the purpose of diagnosis he must be highly skilled in order to be able to detect a diseased portion on the basis a slight difference in hue and saturation.

An example of a conventional image processing apparatus for emphasizing the color of an image is described in "Digital Processing of Endoscopic Color Images", Optics Communications, vol. 55, No. 4, pp. 242-pp. 247. Assume an original image having a color distribution as indicated on the chromaticity coordinate plane of FIG. 1A. When only saturation components of the original image are emphasized, the distribution shown in FIG. 1B is obtained. When only hue components relative to point a representing a chromaticity average are emphasized with respect to point a as its center, a distribution such as is shown in FIG. 1C is obtained. The position of point a' in FIG. 1B differs from that of point a of FIG. 1A, which the position of point a'' of FIG. 1C is the same as that of point a of FIG. 1A. Namely, in FIG. 1B showing saturation emphasis, the distances between the respective points and the origin of the coordinate plane are amplified, while in FIG. 1C, the relative coordinates of eight points with respect to point a are amplified in accordance with their distances from point a.

In the conventional image processing apparatus as described above, assume that the color distribution of an original image is as shown in FIG. 2A. In this case, when only the hue components relative to point a representing a chromaticity average are uniformly emphasized, points b and c are moved to different quadrants, as is shown in FIG. 2B. Accordingly, the tone of point c' is changed and point b' becomes a complementary color. When such an excessive color emphasis is performed, the emphasized image lacks the three color components of the portion of the original image which is to be emphasized. As a result, the color reproduction is poor.

Assume that point a and points therearound—that is, a total of nine points—represent a background image (e.g., an endoscope image of the stomach wall) of an original image. When the points which represent the background image and points b and c, which do not, are subjected to amplification and are thus emphasized, the background image is emphasized to cause a decrease in the S/N ratio, which result in considerable variance in the background hues. As a result, the original purpose of emphasizing points b and c with respect to the background image cannot be achieved, and the level of contrast of the entire image becomes low. This is particularly inconvenient when a portion of a medical image whose color is slightly different from its background, such as a diseased portion, is subjected to emphasis for identification.

SUMMARY OF THE INVENTION

It is an object of the present invention to provide an image processing apparatus which emphasizes the color of an image, in order to obtain a clear image from one in which there is not a wide variation in hue and saturation.

It is another object of the present invention to provide an image processing apparatus wherein a slight change in hue can be enhanced and displayed on a monitor or the like, thereby to enable easy detection of a diseased portion, on the basis of the change in hue, and thus increase the precision and speed of diagnosis when the device is applied to the medical field.

It is still another object of the present invention to provide an image processing apparatus which can selectively increase the saturation of a specific pixel, thereby to effectively emphasize that pixel in relation to a background image which takes up most of the area of a monitor screen.

The image processing apparatus according to the present invention emphasizes the hue of a video signal in accordance with its degree of deviation from an average hue, and amplifies the saturation components of a pixel having its hue emphasized.

BRIEF DESCRIPTION OF THE DRAWINGS

FIG. 4 is a block diagram of a first example of a phase averaging circuit shown in FIG. 3;

FIGS. 5A and 5B are graphs showing the operation of the phase averaging circuit shown in FIG. 4;

FIGS. 6 is a block diagram of a second example of the phase averaging circuit shown in FIG. 3;

FIGS. 7A and 7B are signal waveform charts showing the operation of the phase averaging circuit shown in FIG. 6;

FIG. 8 is a block diagram of an example of a phase modulator shown in FIG. 3;

FIG. 9 is a vector diagram for showing the operation of the hue emphasizing circuit shown in FIG. 3;

FIG. 13 is a block diagram of an image processing apparatus according to a second embodiment of the present invention;

FIG. 15 is a block diagram showing the configuration of the tabulator of the second embodiment of the present invention;

FIG. 16 is a block diagram of an image processing apparatus according to a third embodiment of the present invention; and FIGS. 17A and 17B are signal waveform charts for explaining the operation of the third embodiment of the present invention.

DETAILED DESCRIPTION OF THE PREFERRED EMBODIMENTS

Image processing apparatuses according to preferred embodiments of the present invention will now be described, with reference to accompanying drawings.

Figure 1A:
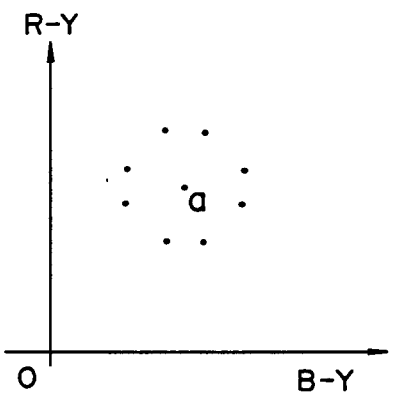
FIGS. 1A, 1B, and 1C each show chromaticity distributions in relation to conventional image processing.
Figure 1B:
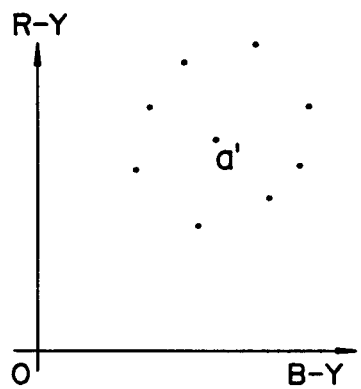
Figure 1C:
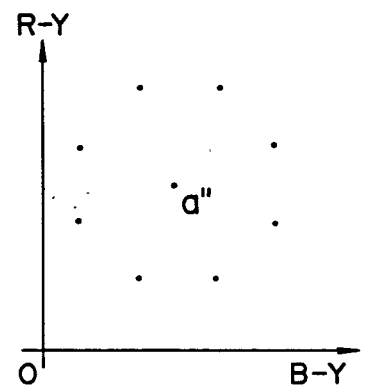
Figure 2A:
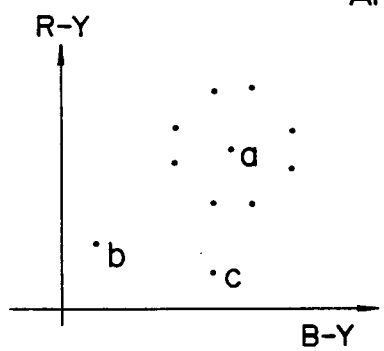
FIGS. 2A and 2B show chromaticity distributions in relation to conventional hue emphasis processing.
Figure 2B:
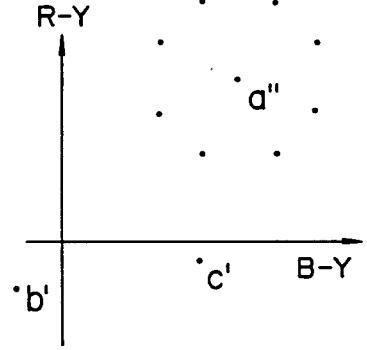
Figure 3:
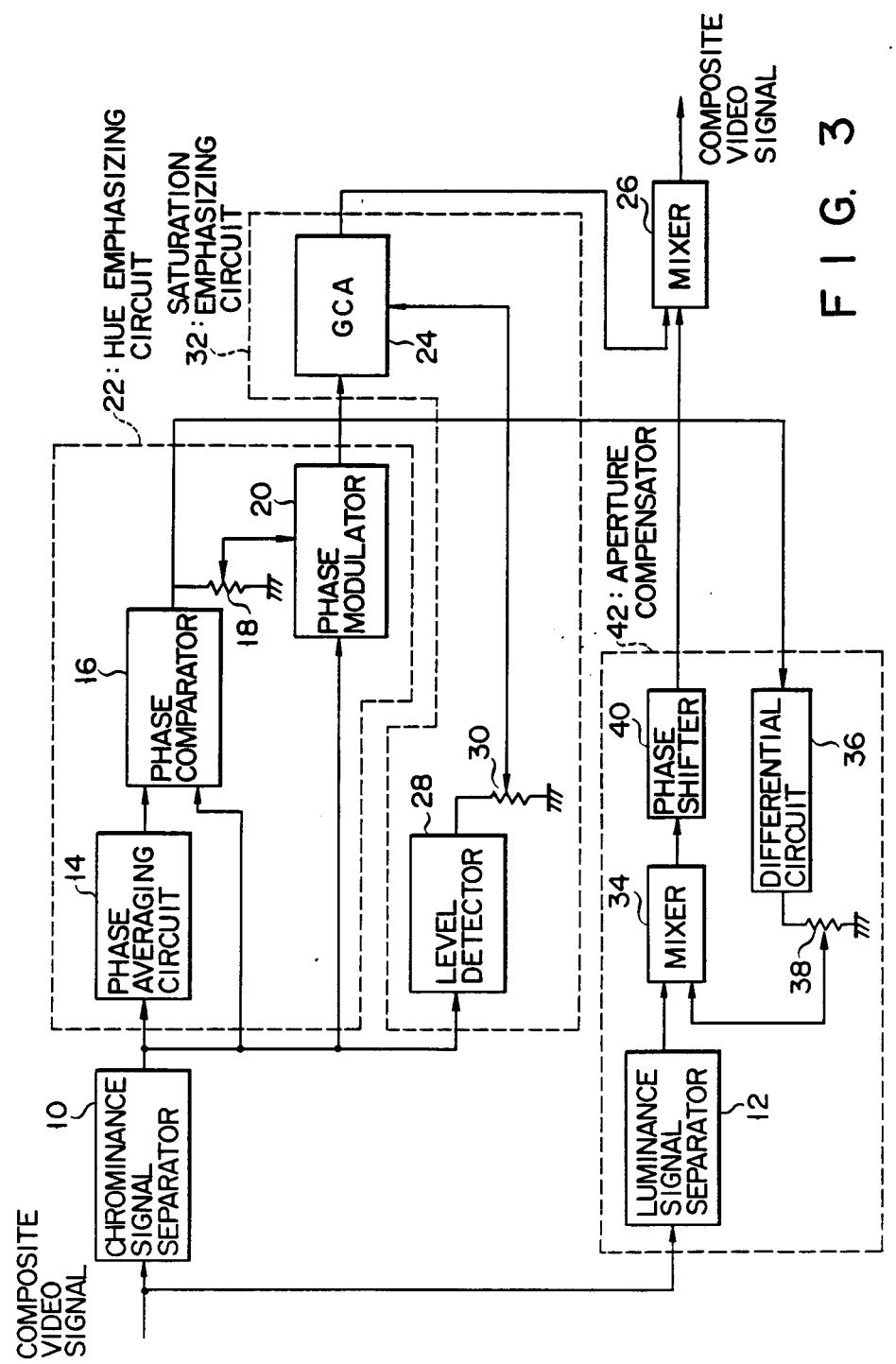
FIG. 3 is a block diagram of an image processing apparatus according to an embodiment of the present invention.

FIG. 3 is a block diagram of a first embodiment of the present invention. In this embodiment, a composite video signal is supplied to chrominance and luminance signal separators 10 and 12, to separate chrominance and luminance signals. The chrominance signal is input to phase averaging circuit 14, which detects an average value of a modulated phase of the chrominance signal modulated by color data of an object.

The chrominance signal and an output from phase averaging circuit 14 are compared by phase comparator 16, to detect a phase difference between the chrominance signal and the average value. An output from comparator 16 is supplied to a control terminal of phase modulator 20 via volume controller 18 which adjusts the output level of comparator 16. The chrominance signal is supplied to an input of phase modulator 20. Modulator 20 modulates the phase of the chrominance signal, in accordance with the output from comparator 16, the amount of phase modulation increasing as the phase of the chrominance signal deviates from the average value. As a result, the hue contrast is increased. Phase averaging circuit 14, phase comparator 16, volume controller 18, and phase modulator 20 together constitute hue emphasizing circuit 22.

FIG. 4 shows a first example of phase averaging circuit 14. To average the phase, the frequency band of the chrominance signal is limited by band-pass filter (BPF) 50.

FIG. 5A shows the frequency band of a general chrominance signal. Modulation of this signal is performed within a bandwidth of 3.58 MHz ±500 kHz. FIG. 5B shows the characteristics of BPF 50. BPF 50 performs band limiting, and since its pass band is 3.58 MHz ±50 kHz, modulation components falling outside this range are removed. As a result, the chrominance phase is averaged.

FIG. 6 shows a second example of phase averaging circuit 14. In this example, a chrominance signal is input to phase detector 60, whereby the chrominance phase thereof is detected. Detector 60 can be a sample-hold circuit or the like. A color subcarrier signal is input to automatic phase controller (APC) 66, whereby its phase is controlled. An output from APC 66 is input as a detection signal to detector 60. When, on the other hand, phase detector 60 is a sample-hold circuit, an output from APC 66 is input thereto as a sampling signal.

Phase detector 60 outputs a voltage signal corresponding to the hue of the chrominance signal. The voltage signal is integrated (averaged) by integrator 68 and input as a phase control input to APC 66, which then automatically sets a reference signal of phase detection to a central phase of modulated hue.

The output from phase detector 60 is also input to attenuator 62, so that its output level is attenuated, and is then input as a phase modulation input to phase modulator 64. An output from APC 66 is input to modulator 64 as an input to be modulated, an output from modulator 64 being a chrominance phase average signal.

FIGS. 7A and 7B are signal waveform charts showing the operation of the phase averaging circuit shown in FIG. 6. FIG. 7A shows an output waveform (voltage waveform of the chrominance phase) when the image of an object whose phase changes by a maximum of 50° within a 1H period (1 horizontal scanning period) is picked up. This signal is input to attenuator 62 and attenuated therein. When the attenuation amount is ½, the phase modulation amount in the output signal of phase modulator 64 becomes 25°, as is shown in FIG. 7B. Thus, the phase amount of the chrominance signal is averaged.

FIG. 8 shows an example of phase modulator 20 as shown in FIG. 3. A chrominance signal is input as a variable delay element for an analog signal to CCD delay circuit 70. The delay time is controlled by the frequency of a transfer clock signal generated by voltage control oscillator (VCO) 72. The oscillation frequency of VCO 72 is controlled by an output voltage of volume controller 18. As a result, the chrominance signal is phase-modulated by the output voltage of volume controller 18, i.e., the output signal of phase comparator 16 (shown in FIG. 3), whereby the modulation amount of the chrominance signal as an output from phase modulator 20 is enhanced with respect to the modulation amount of the input signal, in accordance with its difference from the average value.

FIG. 9 is a vector diagram showing a state wherein the phase modulation amount of the chrominance signal is enhanced by hue emphasizing circuit 22 shown in FIG. 3. Assume that phases of the composite video signal represent colors A and B. These chrominance phases are enhanced to colors A' and B' and output from phase modulator 20. Thus, the phase modulation amount is enhanced from $\theta i$ to $\theta O$. In FIG. 9, it is assumed that the average value of the phase is between colors A and B. Even when the average value is other than this, the hue contrast becomes distinct, since the differences between the hues of the respective colors and the average value are enhanced.

An output from hue emphasizing circuit 22 (an output from phase modulator 20) is supplied to the first input terminal of mixer 26 via gain control amplifier (GCA) 24. The chrominance signal is input to level detector 28 and is subjected to envelope detection (AM detection). The frequency band of detector 28 is limited to about 500 kHz. An output from detector 28 is level-adjusted by volume 30 and is supplied to a gain control terminal of GCA 24. Level detector 28, volume 30, and GCA 24 together constitute saturation emphasizing circuit 32.

Figure 10:
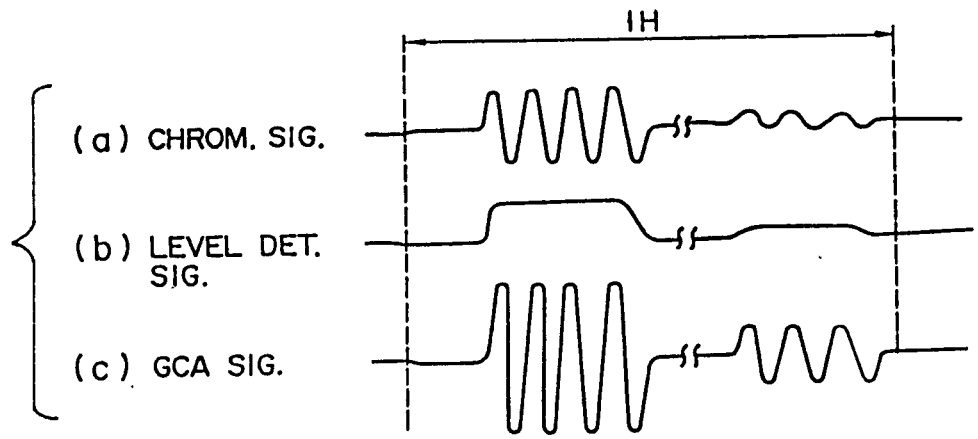
FIG. 10 is a signal waveform chart showing the operation of the saturation emphasizing circuit shown in FIG. 3.

FIG. 10 is a waveform chart showing the operation of saturation emphasizing circuit 32 shown in FIG. 3. Waveform (a) represents a chrominance signal output from chrominance signal separator 10, waveform (b) is an output waveform of level detector 28, and waveform (c) is an output waveform of GCA 24 which enhances the amplitude of a chrominance signal (saturation).

Figure 11:
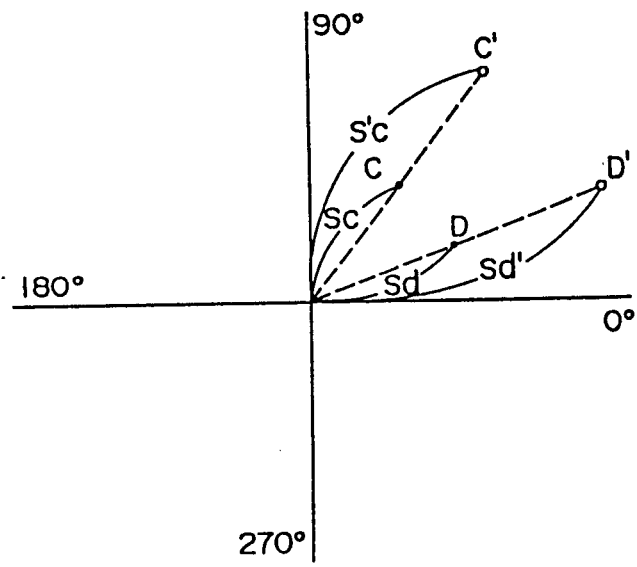
FIG. 11 is a vector diagram showing the operation of the saturation emphasizing circuit shown in FIG. 3.

FIG. 11 shows a state wherein the saturation of a chrominance signal is enhanced by saturation emphasizing circuit 32. Assume that phases of the composite video signal represent colors C and D. These chrominance levels are enhanced and amplified from Sc and Sd to Sc' and Sd', respectively. In this manner, the amplitude of the chrominance level, as an output from phase modulator 20, is modulated in accordance with an input chrominance level, and as a result, the chrominance level (saturation) is enhanced.

An output from saturation emphasizing circuit 32 (output from GCA 24) is input to one input terminal of mixer 26. The luminance signal as another input to mixer 26 is superposed with the chrominance signal whose hue and saturation are enhanced. Thus, a composite video signal is output whose hue and saturation are emphasized.

The luminance signal separated from the composite video signal by luminance separator 12 is input to phase shifter 40 via mixer 34, is phase-shifted, and is input to the other input terminal of mixer 26. An output from phase comparator 16 is differentiated by differential circuit 36 and is input to volume 38. Differential circuit 36 differentiates an output signal from phase comparator 16 and emphasizes a portion of image at which the hue changes greatly. A quadratic differential circuit is used as differential circuit 36, and an output therefrom, which is level-adjusted by volume 38, is input as a gain control input to mixer 34. The phase shift amount of phase shifter 40 is set so as to compensate for a difference between the delay time of a chrominance signal and that of a luminance signal, these delays being caused by hue emphasizing circuit 22 and aperture compensator 42, respectively. Luminance signal separator 12, mixer 34, differential circuit 36, volume 38, and phase shifter 40 together constitute aperture compensator 42. Aperture compensator 42 performs aperture compensation (edge emphasis) of a luminance signal, in accordance with its respective hue emphasis amount. Note that only a portion of a luminance signal whose hue change is steep is aperture-compensated (an aperture signal is mixed in the luminance signal). This is because the output from differential circuit 36 is input to mixer 13 via volume 38.

Figure 12:
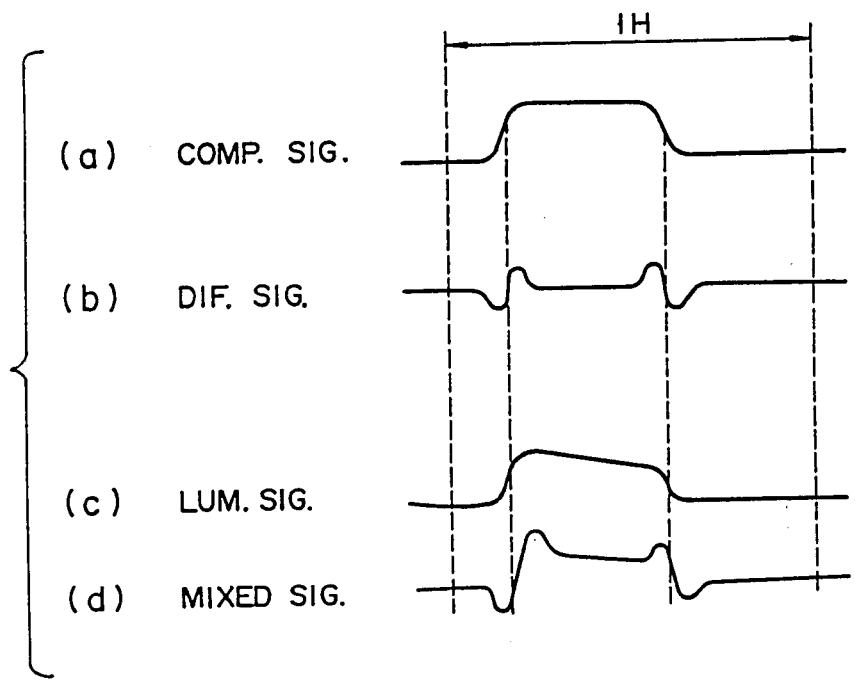
FIG. 12 is a signal waveform chart showing the operation of the aperture compensator shown in FIG. 3.

FIG. 12 shows waveforms of aperture compensator 42 as shown in FIG. 3. In FIG. 12, waveform (a) is an output waveform of phase comparator 16, waveform (b) is an output waveform of differential circuit 36, waveform (c) is an output waveform of luminance signal separator 12, and waveform (d) is an output waveform of mixer 34.

As has been described above, according to the first embodiment of the present invention, hues can be enhanced by separating chrominance and luminance signals from a composite video signal, and enhancing the phase of the chrominance signal in accordance with a difference between the phase of the chrominance signal and an average phase value. Saturation can be enhanced by amplifying the level of the phase-enhanced chrominance signal, in accordance with the level of the chrominance signal. In addition, the luminance signal is mixed with a hue- and saturation-enhanced chrominance signal by an aperture compensator which emphasizes an edge of the luminance signal, in accordance with the hue enhancing amount. Therefore, only a portion of the luminance signal, where a slight hue change occurs, is aperture-compensated. A hue change is enhanced and then displayed on a monitor or the like. As a result, when the present invention is applied to an electronic endoscope, a hue enhancing system for a color video signal, which enables easy detection of a diseased portion and contributes to improvements in diagnostic precision and speed can be obtained. It should be noted, though, that saturation emphasizing circuit 32 and aperture compensator 42 are not always needed.

An image processing apparatus according to a second embodiment of the present invention will be described. FIG. 13 is a block diagram of the second embodiment. The apparatus of this embodiment processes a still image. An NTSC signal is supplied to luminance signal (Y)/chrominance signal (C) separator 110. Chrominance signal C is supplied to amplitude (AM) and phase detectors 112 and 114, and saturation and hue signals Vs and V$\theta$ are respectively obtained. Luminance signal YH, saturation signal Vs, and hue signal V$\theta$ are written in frame memories 116, 118, and 120, respectively. Thus, luminance, saturation, and hue components of each frame are written in memories 116, 118, and 120, respectively.

Figure 14:
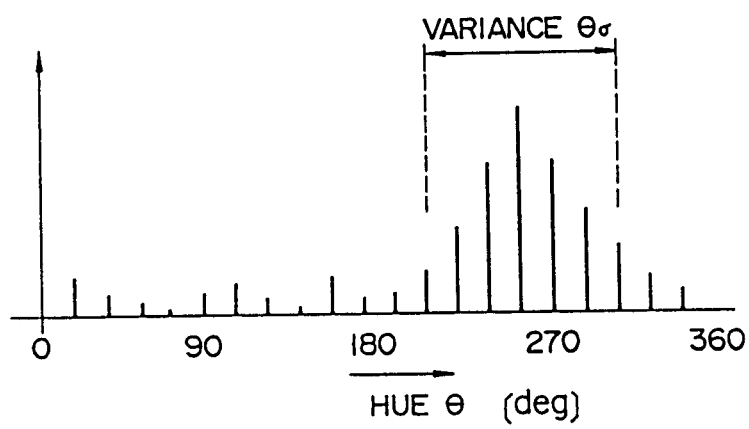
FIG. 14 is a view for explaining the operation of the tabulator of the second embodiment of the present invention.

Hue signal V$\theta$ read out from frame memory 120 is supplied to hue (V$\theta$) tabulator 122. Tabulator 122 forms a histogram of frequency u of hue V$\theta$. FIG. 14 shows an example of a histogram. During formation of the histogram, no signal is read out from frame memories 116 and 118. When the histogram is formed, signals are synchronously read out from memories 116, 118, and 120. Tabulator 122 outputs a discrimination signal representing that a hue of each pixel read out from memory 120 falls outside a range of variance $\theta\sigma$ from a hue of a maximum frequency as a central value.

In this case, saturation signal Vs read out from frame memory 118 is amplified by gain control amplifier (GCA) 124. The amplification factor of GCA 124 is controlled by the discrimination signal output from V$\theta$ tabulator 122. More specifically, GCA 124 amplifies saturation of each pixel read out from frame memory 118 only when the hue of the pixel falls outside the range of variance $\theta\sigma$ from a hue of a maximum frequency as a central value, and does not amplify when the hue of the pixel falls in this range of $\theta\sigma$.

Particularly, in an endoscopic image, hue and saturation of its background portion exist within a predetermined variance having a point of a maximum frequency as a central value. Note that although saturation changes in accordance with the illuminance of an object, hue does not. Therefore, when saturation of each pixel is amplified only when the hue of the pixel falls outside the range of variance $\theta\sigma$ from a hue of a maximum frequency as a central value, saturation of only a portion of an image other than the background can be emphasized with respect to the background, and a portion of a hue of a less frequency can be easily identified.

Saturation signal Vs' output from GCA 124 is supplied to modulator 126. Hue signal V$\theta$ is superposed on saturation signal Vs' in modulator 126 by using a subcarrier signal (not shown), thereby obtaining chrominance signal C'. The luminance signal read out from frame memory 116 is mixed with chrominance signal C' by adder 128 to obtain an NTSC signal.

The operation timings of the respective portions are controlled by timing pulses generated by timing generator 130 connected to an NTSC input. Since digital memory elements are used as frame memories 116, 118, and 120, A/D and D/A converters are connected before and after memories 116, 118, 120, respectively. However, these converters are not shown in FIG. 13.

FIG. 15 is a block diagram showing a configuration of V$\theta$ tabulator 122. An explanation will be made for a signal whose hue is represented by a 4-bit signal, i.e., which has 16 levels of 0 to 15. An output from frame memory 120 is input to either histogram circuit 134 or comparator 136 through switch 132. During table processing (histogram generation), switch 132 is connected to contact a side. Hue data $V\theta$ of one frame are sequentially supplied to histogram circuit 134. Every time data of the same hue, among 16 levels of $V\theta 0$ to $V\theta 15$, are input, its frequency is updated. Namely, histogram circuit 134 has 16 stacks of $V\theta 0$ to $V\theta 15$. Each stack stores a sum of the number of data of the same hue.

Histogram circuit 134 is connected to maximum value detector 138 which detects a stack $V\theta$max, among 16 stacks of $V\theta 0$ to $V\theta 15$, which has a maximum histogram data. Since the histogram data of stack $V\theta 2$ is 97 and is maximum, $V\theta 2$ is $V\theta$max. Detector 138 outputs to comparator 136 hue range $V\theta\sigma$ which deviates from maximum value $V\theta$max by a predetermined variance range. Tabulation is thus finished.

Emphasis processing utilizing tabulation will be described. Switch 132 is connected to contact b side. In this case, signals are synchronously read out from frame memories 116, 118, and 120. Thus, hue data $V\theta$ of one frame are sequentially compared by comparator 136 with hue range $V\theta\sigma$ that falls within a predetermined variance range from maximum value $V\theta$max. When hue data read out from frame memory 120 falls within $V\theta\sigma$, comparator 136 outputs a flag signal. As a result, pixel points whose hue falls within the predetermined variance from a hue of a maximum frequency can be distinguished substantially in a real time manner, and the flag signal can be output.

In response to the flag signal from comparator 136, GCA 124 emphasizes saturation of a pixel having a hue which falls outside the predetermined variance range from a hue of the maximum frequency.

In this manner, since an image other than a background image is saturation-emphasized in the second embodiment, an effective color emphasis can be performed. As a result, a portion of an image, such as a diseased portion, which is to be emphasized with respect to a background and whose color is slightly different from that of the background can be easily distinguished. Although not shown, not only saturation but also hue can be emphasis-controlled in accordance with the flag signal output from $V\theta$ tabulator 122. In addition to or instead of above saturation emphasis, saturation of a background portion can be suppressed.

FIG. 16 is a circuit diagram of a third embodiment of the present invention. The same reference numerals denote the same parts as in the second embodiment. Instead of $V\theta$ tabulator 122, an averaging circuit is connected to phase detector 114. This embodiment detects the average data as the maximum data. Therefore, when a plurality of hue groups of a high frequency, such as a background, exist, an error becomes large. However, when a single hue group of a high frequency exists, the third embodiment is effective. In this embodiment, since processing is performed within a time lag of a frame integration time, it is performed in a real time manner and can be applied to processing of a moving image as well.

Hue signal $V\theta$ is integrated and averaged by low-pass filter (LPF) 142 having a time constant of one frame. Thus, average value $V\theta M$ of hues of one frame is output from LPF 142. DC voltage $\Delta V$ of power source 143 is added to and subtracted from hue average value $V\theta M$ by adder 144 and subtracter 146, respectively.

Output $V\theta M + \Delta V$ from adder 144 is supplied to the inverting input terminal of comparator 148. Output $V\theta M - \Delta V$ from subtracter 146 is supplied to the noninverting input terminal of comparator 150. The noninverting input terminal of comparator 148 and inverting input terminal of comparator 150, respectively, receive real time hue signal $V\theta$ output from phase detector 114. Output signals from comparators 148 and 150 are supplied to AND gate 152.

Comparators 148 and 150 and AND gate 152 constitute a window comparator. The window comparator determines whether real time hue signal $V\theta$ falls within a range of $V\theta M \pm \Delta V$. If Yes, the window comparator outputs an L-level signal. If No, the window comparator outputs an H-level signal. FIGS. 17A and 17B show the input and output signal waveforms of the window comparator. The window width of this window comparator $\pm \Delta V$ corresponds to variance $\theta\sigma$ of $V\theta$ tabulator 122 of the second embodiment.

Therefore, AND gate 152 outputs L- and H-level pulses corresponding to a background hue portion and a portion other than that, respectively. These signals serve as a gain control signal of GCA 124. In this manner, GCA 124 amplifies saturation signal Vs of a portion, other than a background image, by the H level gain control signal.

With the third embodiment, since only an image other than a background image is saturation-emphasized, effective color emphasis can be performed.

The present invention is not limited to the above-described embodiments. Various changes and modifications may be made without departing from the spirit and scope of the invention. The present invention can have an application other than an electronic endoscope.

As described above, according to the present invention, since a slight change in hue is enhanced and displayed on a monitor or the like, a diseased portion can be easily detected based on the change in hue. Therefore, if the present invention is applied to the medical field, a hue enhancing system for a color video signal which contributes to improvements in the diagnostic precision and speed can be realized.

Further, according to the present invention, only an image other than a background occupying most of a frame is saturation-emphasized. Therefore, an image processing apparatus which can effectively emphasize a portion which is to be distinguished, not a background, can be obtained.

What is claimed is:

1. A video image processing means comprising:
    detecting means for obtaining a frequency distribution of hues of an image of a single video frame and for detecting pixels of said video frame which have a hue falling outside a predetermined variance range from a hue of a maximum frequency; and
    saturation enhancing means for enhancing saturation of a detected pixel.

2. An apparatus according to claim 1, wherein:
    said detecting means comprises means for obtaining a hue component by phase-detecting a chrominance signal of a video signal; and
    said saturation enhancing means comprises means for obtaining a saturation component by amplitude-detecting the video signal, and means for amplifying the saturation component.

3. An apparatus according to claim 2, wherein said detecting means comprises:
    memory means for storing hue components of a single video frame;

means for obtaining a frequency distribution of hues stored in said memory means and for detecting a hue falling outside a predetermined variance range from a hue of a maximum frequency; and means for comparing a hue component read out from said memory means with the detected hue and, when the read-out hue component coincides with the detected hue, outputting an enhancement designating signal to said saturation enhancing means.

4. A video image processing apparatus comprising:

detecting means for obtaining a frequency distribution of an image of a signal video frame and for detecting pixels of said video frame which have a hue falling outside a predetermined range from a hue of an average frequency; and saturation enhancing means for enhancing saturation of a detected pixel.

5. An apparatus according to claim 4, wherein:

said detecting means comprises means for obtaining a hue component by phase-detecting a chrominance signal of a video signal; and said saturation enhancing means comprises means for obtaining a saturation component by amplitude-detecting the video signal, and means for amplifying the saturation component.

6. An apparatus according to claim 5, wherein said detecting means comprises:

low-pass filter means for obtaining an average value of hue components of one video frame mixer means for adding and subtracting a predetermined value to and from the average value, in order to generate first and second threshold signals and window comparator means for comparing the first and second threshold signals with the hue component and, when the hue component falls outside the first and second threshold ranges, outputting an enhancement designating signal to said saturation enhancing means.

* * * * *